(12) United States Patent
Yang

(10) Patent No.: US 8,963,496 B2
(45) Date of Patent: Feb. 24, 2015

(54) LITHIUM BATTERY PACK AND SYSTEM FOR CHARGING THE SAME

(75) Inventor: Dezhong Yang, Nanjing (CN)

(73) Assignee: Chervon Intellectual Property Limited (CN)

( * ) Notice: Subject to any disclaimer, the term of this patent is extended or adjusted under 35 U.S.C. 154(b) by 1580 days.

(21) Appl. No.: 11/986,388

(22) Filed: Nov. 21, 2007

(65) Prior Publication Data

US 2008/0218124 A1  Sep. 11, 2008

(30) Foreign Application Priority Data

Mar. 5, 2007  (CN) .......................... 2007 2 0034976

(51) Int. Cl.
| | |
|---|---|
| *H02J 7/00* | (2006.01) |
| *H01M 2/10* | (2006.01) |
| *H01M 10/052* | (2010.01) |
| *H01M 10/44* | (2006.01) |
| *H01M 10/058* | (2010.01) |

(52) U.S. Cl.
CPC .......... *H01M 2/1066* (2013.01); *H01M 10/052* (2013.01); *H01M 10/058* (2013.01); *H01M 10/44* (2013.01); *Y02E 60/122* (2013.01)
USPC ........................................................ 320/113

(58) Field of Classification Search
USPC ................. 320/113, 132, 134, 136, 145, 160
See application file for complete search history.

(56) References Cited

U.S. PATENT DOCUMENTS

| | | | |
|---|---|---|---|
| 7,176,654 B2 | 2/2007 | Meyer et al. | |
| 7,378,819 B2* | 5/2008 | Wang et al. ................... | 320/121 |
| 7,508,171 B2* | 3/2009 | Carrier et al. ................. | 320/138 |
| 2004/0070369 A1* | 4/2004 | Sakakibara ................... | 320/128 |
| 2004/0135548 A1* | 7/2004 | Takano et al. ................. | 320/132 |

\* cited by examiner

*Primary Examiner* — Richard V Muralidar
(74) *Attorney, Agent, or Firm* — Greenberg Traurig, LLP

(57) ABSTRACT

A lithium battery pack according to the present invention has inherent information stored therein, which comprises a plurality of cells, nominal voltage, maximal voltage of the cells, range of temperature etc. A charging parameter is determined by a charging controller based on an identified data of the cells and the inherent information, and is transmitted to an adapter. A controlled module in the adapter receives the charging parameter through a control terminal and adjusts an AC/DC circuit to output a current with accurate charging voltage to the battery pack.

19 Claims, 7 Drawing Sheets

LITHIUM BATTERY PACK AND SYSTEM FOR CHARGING THE SAME

CROSS-REFERENCE TO RELATED APPLICATION

This application claims priority under 35 U.S.C. §119 of Chinese Application 200720034976.6, filed Mar. 5, 2007, which is hereby incorporated by reference.

FEDERALLY SPONSORED RESEARCH OR DEVELOPMENT

Not Applicable.

FIELD OF THE INVENTION

The present invention generally relates to a lithium battery pack and charging system thereof, and more particularly, to a lithium battery pack for a power tool and system for charging the same.

BACKGROUND OF THE INVENTION

Battery powered power tools are widely used in many fields because of portability. Rechargeable lithium battery packs with advantages in weight and capacity are one of the best battery choices for power tools. Lithium battery packs have special charging requirements for safety and efficiency, however.

A common charging system for a lithium battery pack includes a charger that outputs power having a constant current or constant voltage for charging a battery pack which has a nominal voltage. A disadvantage is that a charger is only operable to charge a corresponding battery pack. In addition, a common charger provides different charging parameters based on information of the battery cells which are stored in the battery pack. A disadvantage is that the charger needs to obtain the relative information of the battery pack before charging, and then confirm the charging parameter, which is obviously complex.

SUMMARY OF THE INVENTION

The lithium battery pack according to the present invention has a charging controller for determining the charging parameter and sending a control signal to an adapter which provides charging energy to the battery pack. A controlled module in the adapter receives the control signal and adjusts an AC/DC circuit to output an accurate voltage.

Furthermore, the charging controller is integrated in the battery pack. Before the process of charging, the charging controller identifies initial data of the lithium battery cells, especially the individual voltage of each cell, through sensors, such as a voltage sensor, temperature sensor, or current sensor. The battery pack also has inherent information stored therein, which comprises a plurality of cells, nominal voltage, maximal voltage of the cells, range of temperature, etc. The charging parameter is determined by the charging controller based on the identified data of the cells and the inherent information, and transmitted to the controlled module. The controlled module receives the charging parameter through a control terminal and adjusts the AC/DC circuit to provide a current with accurate charging voltage. In the whole charging process, the charging control portion is executed in the battery pack, and the adapter is only operable for providing power as required by the battery pack. Therefore the charging process will be more accurate, rapid and safe.

According to one aspect of the present invention, the battery pack also includes a protection module for providing charging protection and discharging protection to ensure the safety of the lithium cells. The protection module includes a charging protection module and a discharging protection module. The charging protection module has at least one function of over-current protection, overcharge protection, over-voltage protection and monitoring voltages of individual cells; the discharging protection module has at least one function of over-current protection, short preventing and over-discharge protection.

According to another aspect of the invention, the electrical charging system includes a first battery pack having a plurality of lithium-based battery cells, each having an individual state of charge, wherein the first battery pack has a first charging controller operable to monitor the individual state of charge of at least one battery cell and to control a charging current being supplied to the first battery pack based at least in part on the state of charge of the at least one battery cell. The system also includes a second battery pack having a plurality of lithium-based battery cells, each having an individual state of charge, wherein the second battery pack has a second charging controller operable to monitor the individual state of charge of at least one battery cell and to control a charging current being supplied to the second battery pack based at least in part on the state of charge of the at least one battery cell. The total number of lithium-based battery cells in the first battery pack is different than the total number of lithium-based battery cells in the second battery pack. Also included is an electrical device being operable to supply power to the first battery pack and the second battery pack.

An advantage of the present invention is that the lithium battery pack can be charged by a common adapter or charger. An additional advantage of the present invention is that lithium-based battery packs with different charging parameters can be charged by a common adapter or charger. In addition, lithium battery packs having different numbers of cells can be charged by a common adapter.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION OF THE INVENTION

Figure 1:
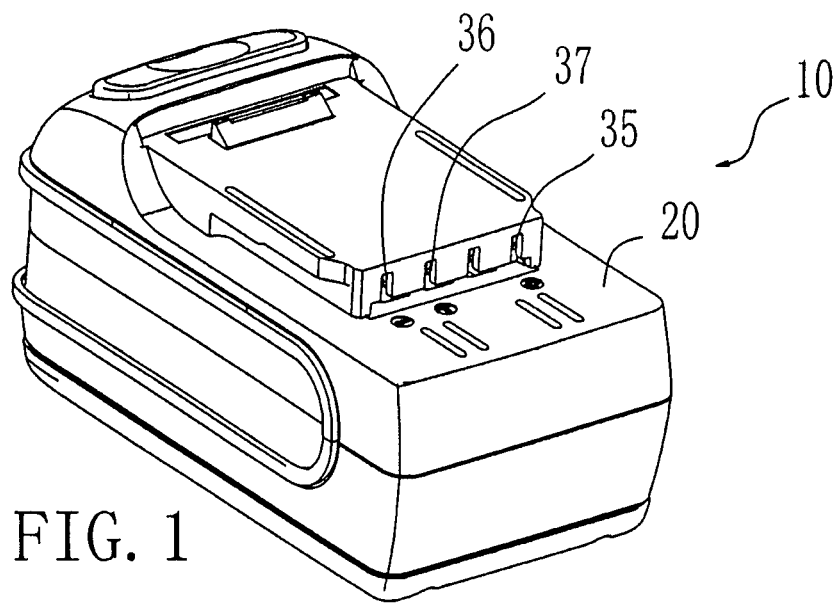
FIG. 1 is a perspective view of a battery pack.
Figure 4:
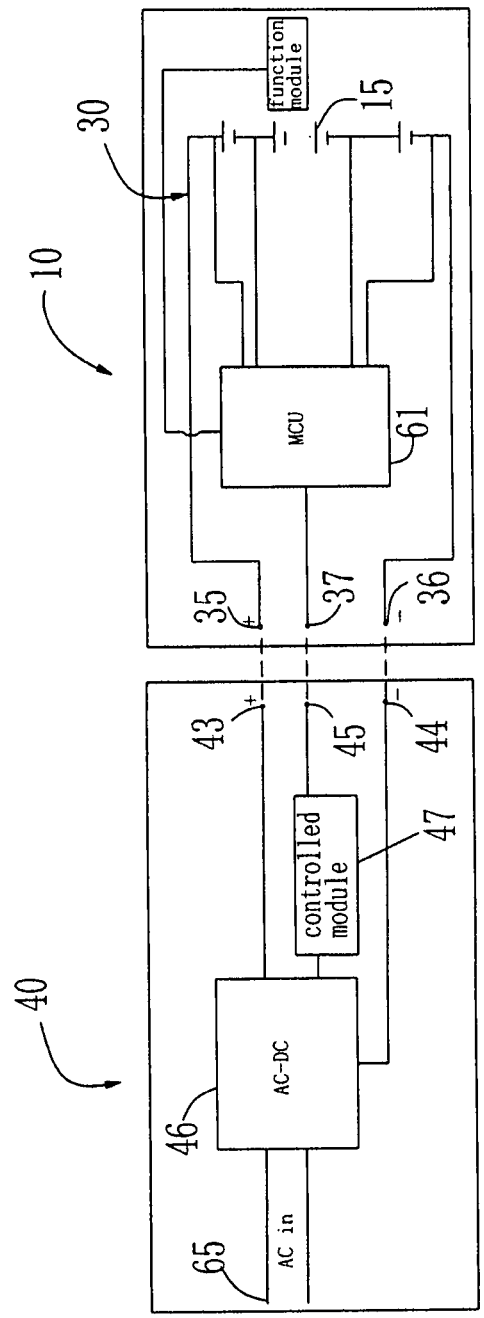
FIG. 4 shows an electrical connection between a battery pack and an adapter.

A battery pack 10 as illustrated in FIG. 1 is adapted for providing power to a power tool. The battery pack 10 includes a housing 20 which encloses a series of battery cells (not shown) and a control circuit 30 (FIG. 4). Preferably, the battery cells are made of a lithium-based chemical material. The battery pack 10 has a nominal voltage, the value of which is determined by the individual voltage of each cell and the number of cells.

The battery pack 10 is configured to have one or more terminals 35-37 and is electrically connectable to an electrical device, such as an adapter 40 and/or a power tool. In some constructions, electrical connection between the terminals 35-37 needs support of a physical connection between the battery pack 10 and the electrical device. In other constructions, electrical connection is confirmed by signal and then electrical energy is transmitted between the battery pack 10 and the electrical device in waves. In some constructions, as illustrated in FIG. 1, the battery pack 10 includes a positive battery terminal 35, a negative battery terminal 36 and a second control terminal 37. In some constructions, the battery pack 10 can include more or fewer terminals.

In one embodiment, the battery pack 10 includes a controller 60 or component electrically connected to one or more battery terminals. The controller 60 analyzes the information of the battery pack 10 stored in the circuit 30 to obtain a charging parameter, and sends the charging parameter to the electrical device physically connected thereto. The charging parameter could include, for example. The number of the cells, nominal voltage, maximal voltage, temperature range, and initial state of the battery cells or any other information defining a characteristic of the cell. In some constructions, the charging controller 60 of a battery pack 10 has a Micro Control United (MCU) 61.

In another embodiment, the battery pack 10 includes a voltage sampling circuit for monitoring voltage of an individual cell 15. The voltage sampling circuit is integrated in the charging controller 60.

Figure 2:
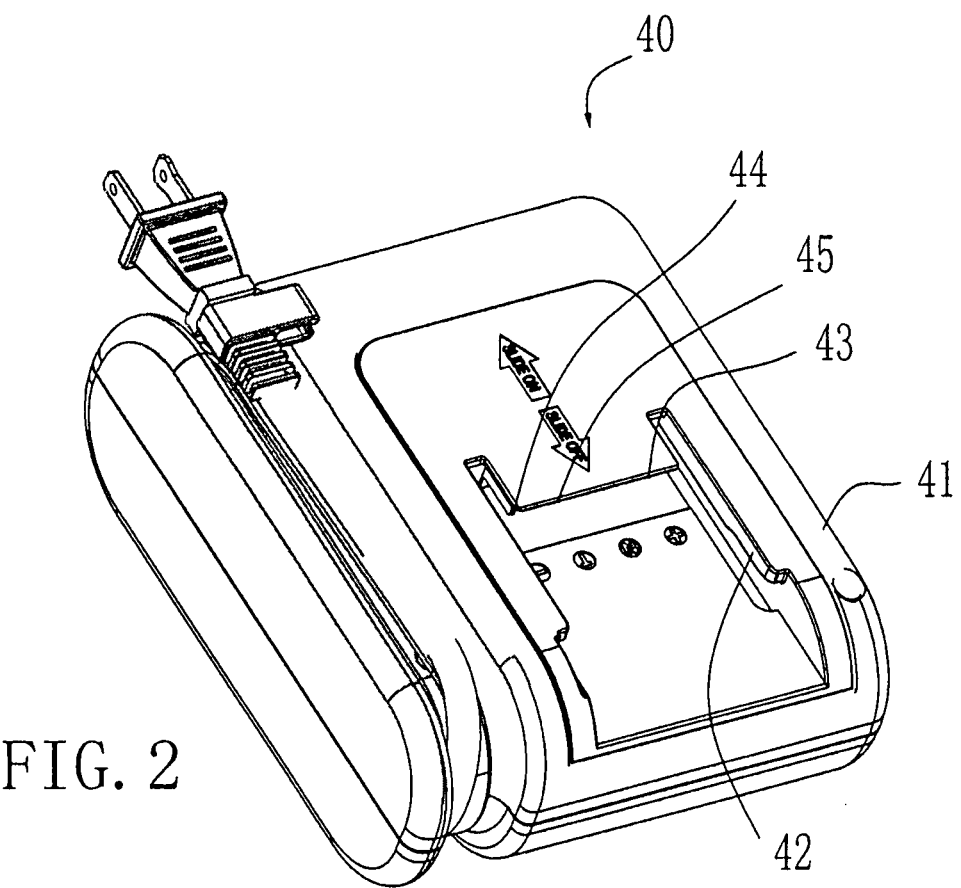
FIG. 2 is a perspective view of an adapter.
Figure 3:
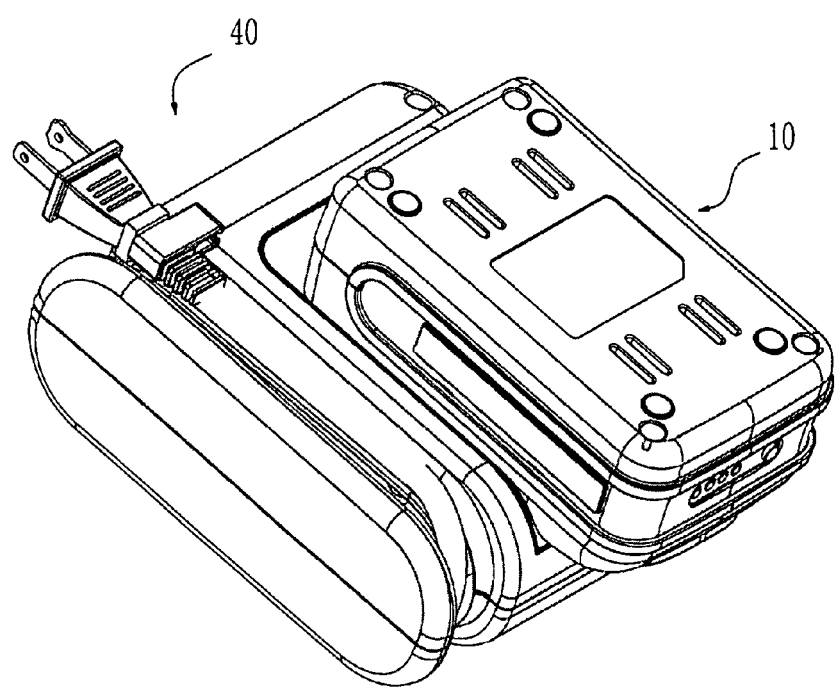
FIG. 3 shows the battery pack of FIG. 1 electrically and physically connected to the adapter of FIG. 2.

As shown in FIGS. 2 and 3, the battery pack 10 is also configured to be connectable with an electrical device, such as an adapter 40. In some constructions, the adapter 40 includes a housing 41. The housing 41 provides a connecting portion 42 to which the battery pack 10 is connected. The connecting portion 42 includes one or more electrical terminals for electrically connecting the adapter 40 to the battery pack 10. The terminals provided in the adapter 40 are configured to mate with the terminals of the battery pack 10 for receiving a control signal from the pack 10 and transferring power to the battery pack 10.

As illustrated in FIG. 2, the adapter 40 includes a positive terminal 43, a negative terminal 44, and a first control terminal 45. The first control terminal 45 may be configured to mate with the second control terminal 37 of the battery pack 10.

Figure 5:
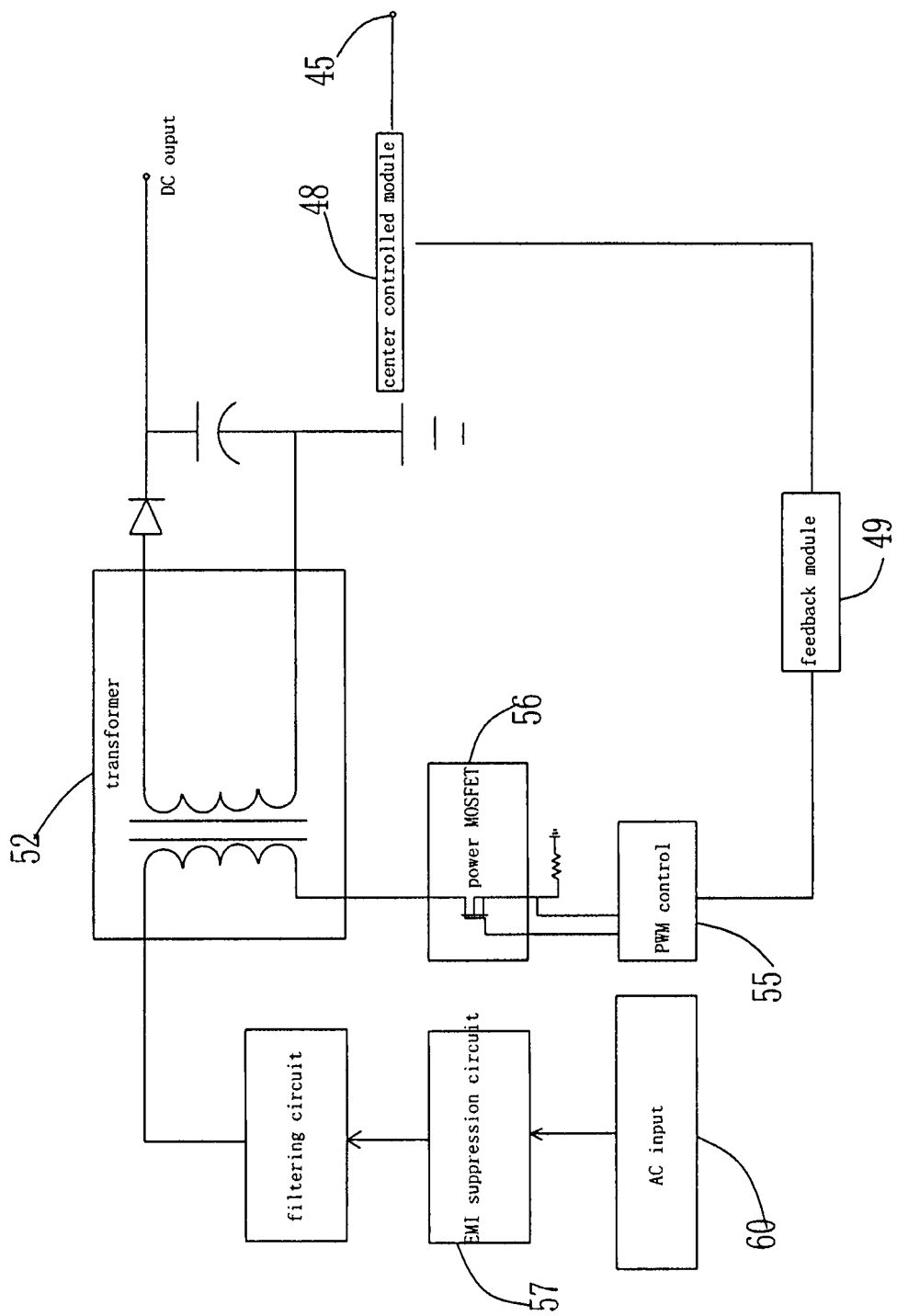
FIG. 5 is a circuit schematic view of an adapter.

The adapter 40 may also include an AC/DC section 46 and a controlled module 47. In some constructions, the controlled module 47 includes a center controlled module 48 and a feedback module 49 (FIG. 5). The center controlled module 48 could be a MCU with relevant circuit (as is known in the art), and the feedback module 49 could be an optocoupler with relevant circuit (as is also known in the art). The controlled module 47 may also include an indication circuit (as are well known in the art).

As shown in FIG. 4, inside the battery pack 10, the charging controller 60 determines charging mode based on the state of the cells 15 and sends a control signal to the second control terminal 37. Inside the adapter 40, the first control terminal 45 receives the outside signal, which contains the charging parameter, and the controlled module 47 adjusts the AC/DC section 46 to convert AC supply to DC as required.

The adapter as shown in FIG. 5 includes a transformer 52, a feedback module 49, a Pulse-Width Modulation (PWM) controller 55, and a power metal oxide semiconductor field effect transistor (MOSFET) 56. The AC supply flows through an Electro Magnetic Interference (EMI) suppression circuit 57 and a primary input filtering circuit to the transformer 52, and then passes a secondary rectification circuit to output high voltage DC, which flows through the feedback module 49 and the PWM controller 55. The MCU sends a charging control signal to the PWM controller 55, which control the power MOSFET 56 to obtain the required output voltage or current.

The power supply input circuit 60 can include a protective element, e.g., a fuse, a NTC (negative temperature coefficient) or PTC (positive temperature coefficient) resistor, or a varistor (not shown), such that when a short is induced, the current flowing through the power inputting terminal 65 will not exceed a predetermined value. Thus, the impact current occurring at the beginning of the power supplying is reduced. Moreover, surge voltage in the input line is absorbed to avoid damage of the elements in the adapter 40 caused by over voltage. Rectification circuits cam also be utilized to rectify ripple voltage in the input voltage to make it smooth, and to output a relatively steady DC voltage. Meanwhile the rectification circuits filter high frequency switching noise to improve transmitting character of the circuit.

Figure 6:
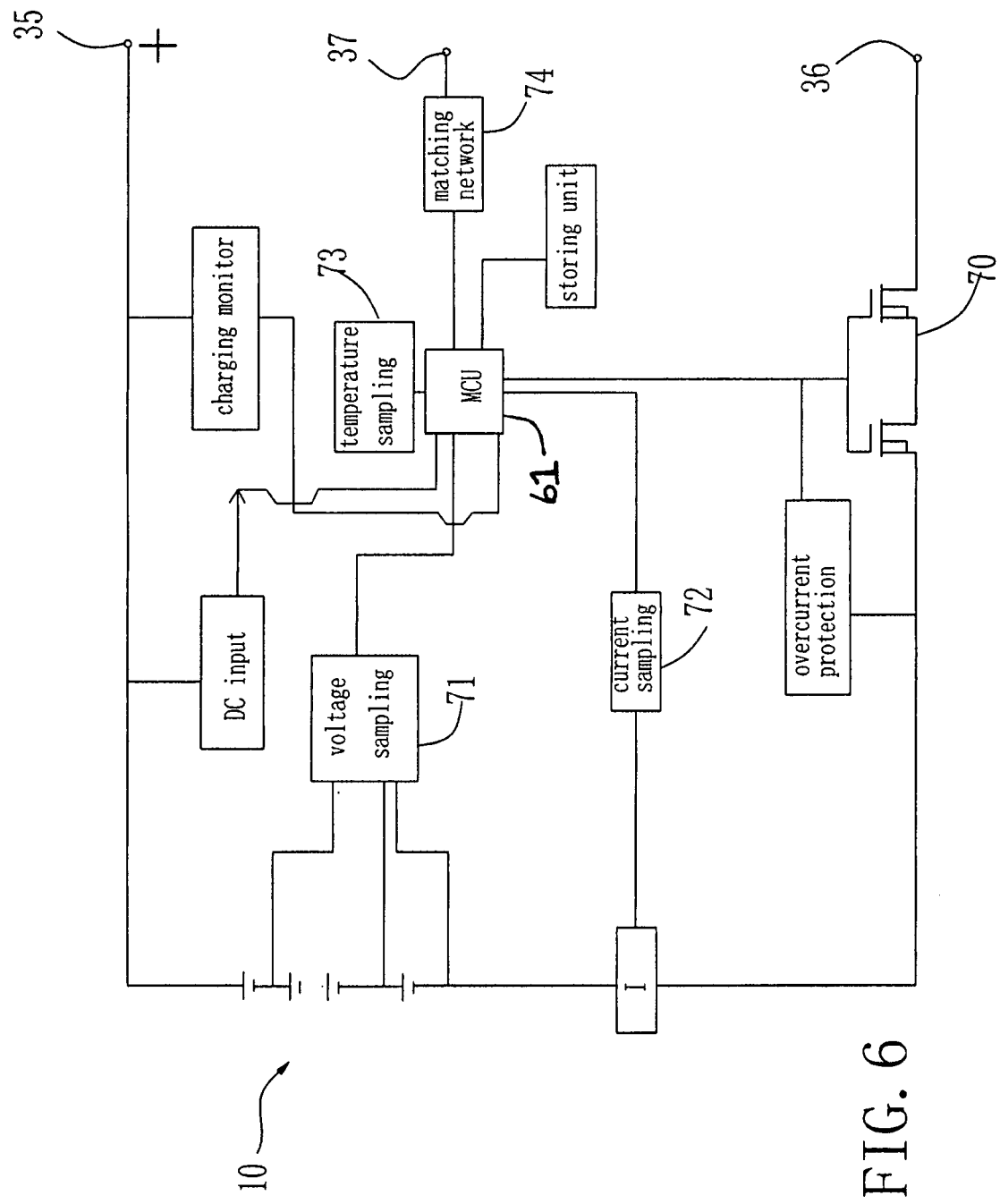
FIG. 6 is a circuit schematic view of a battery pack.

The charging controller 60 of the battery pack 10 includes the MCU 61 and a MOSFET 70 which controls switching on/off of the MCU 61, as shown in FIG. 6. The charging controller 60 further includes a voltage sampling circuit 71, a current sampling circuit 72, and a temperature sampling circuit 73, through which the MCU 61 obtains the values of the voltage, current and temperature of the battery pack 10 and sends the charging signal to the second control terminal 37 through a matching network 74. The MCU 61 controls the output voltage of the adapter 40 in such a way that when the temperature of the cells 15 lies within a predetermined allowed range and the voltage of an individual cell is higher than a predetermined allowed charging voltage, the battery pack 10 is charged in constant current; otherwise, when the voltage of an individual cell is equal to or greater than a desired value, e.g., 4.2V, the battery pack 10 is charged in constant voltage, while the MCU 61 monitors the temperature and current, and shuts down the charging process if the current rate is smaller than a desired value, e.g., 0.1 C.

Figure 7A:
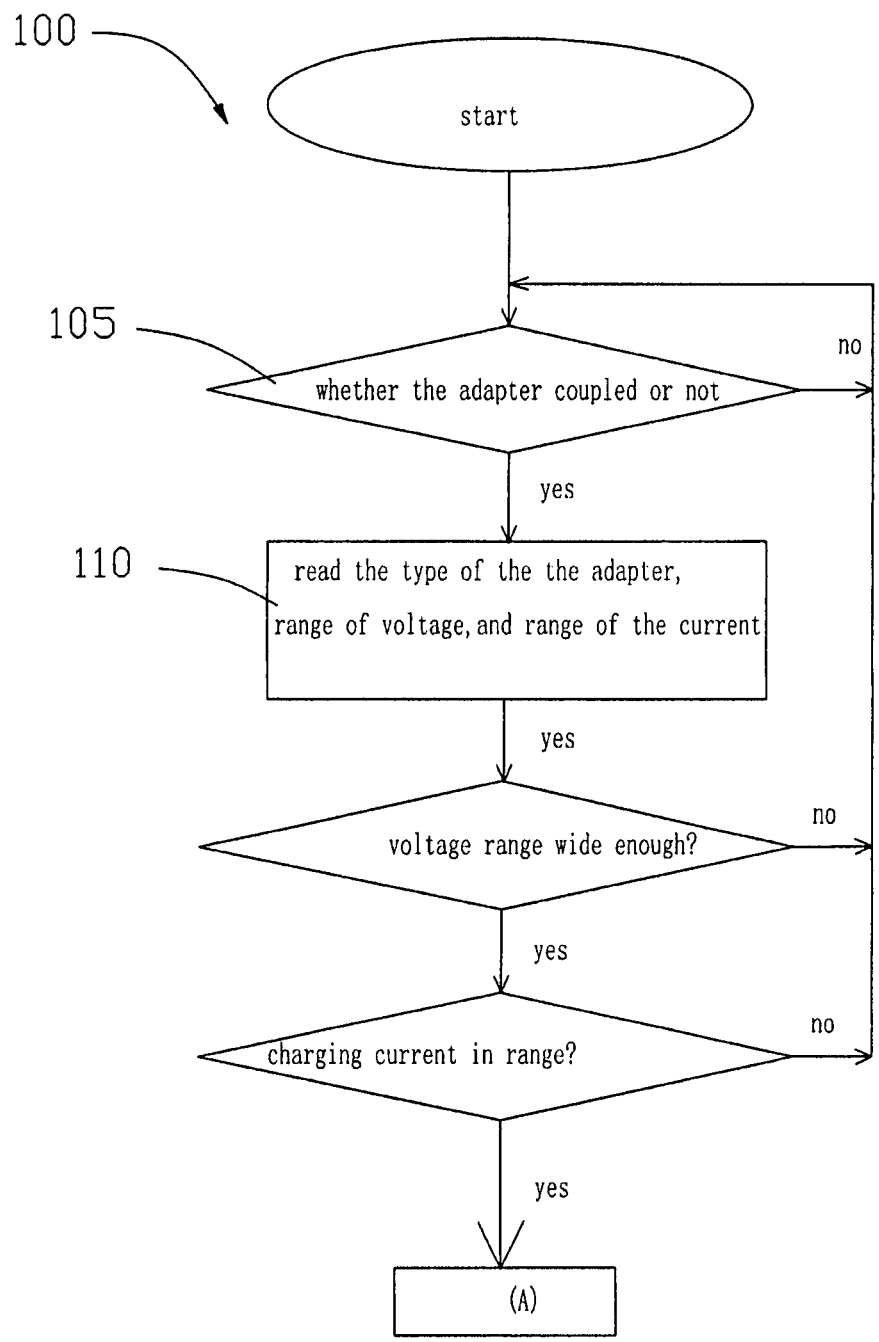
FIGS. 7a and 7b are flowcharts illustrating charging process of the battery pack embodying the present invention.
Figure 7B:
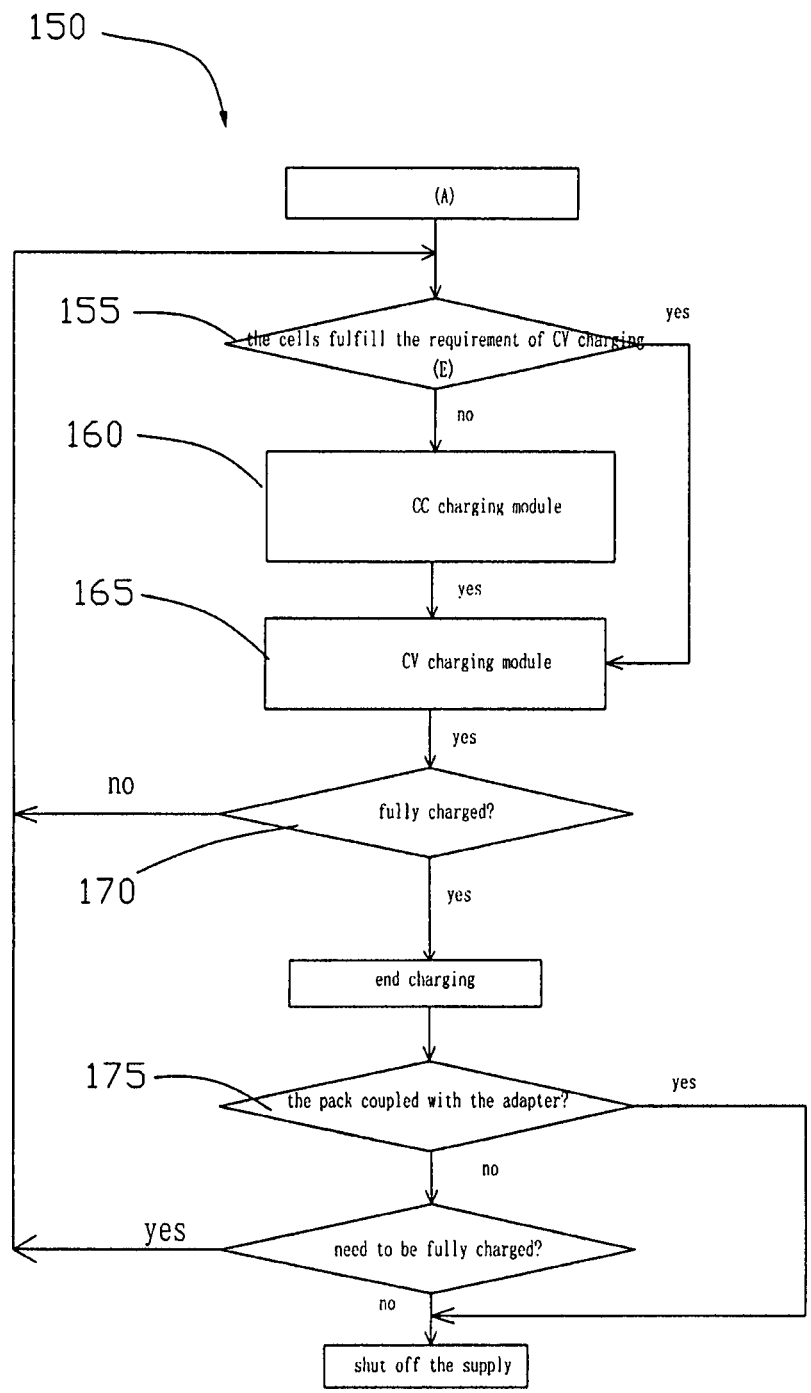

The charging control workflow mainly comprises two modules, which are determination module 100 as shown in FIG. 7A and execution module 150 as shown in FIG. 7B. The determination module 100 judges if an adapter is coupled to the battery pack 10 at step 105, which is confirmed if terminals of the battery pack 10 and the adapter 40 are connected. When the adapter 40 is coupled to the pack 10, the charging controller 60 reads the information of the adapter 40, such as the type of adapter, range of the voltage, and range of the current, through the control terminal, and determines whether the adapter 40 mates with the battery pack 10 at step 110. If they match with each other, the process shifts to the execution module 150.

In the execution module 150, the battery pack 10 monitors state of the cells 15 to determine whether the cells should be charged in constant voltage at step 155. If constant-voltage charging requirement is reached, the process shifts to step 165 which is the constant-voltage charging module, otherwise the process shifts to step 160 which is the constant-current charging module. After the constant-current charging process at step 160 is finished, the process shifts to the step 165. After the constant-voltage charging process at step 165 being finished, the charging controller 60 estimates whether the cells are fully charged at step 170. Operation returns to step 155 if the cells are not full charged, otherwise the MOSFET 70 will end the charging process. If the battery pack 10 is still coupled with the adapter 40, it needs to determine whether a supplemental charge is required; if yes, the process returns to step 155, otherwise it closes the power supply. The constant-current charging and constant-voltage charging are performed by either Proportional-Integral-Differential (PID) control or fuzzy control (as are well known in the art). A temperature measuring and control module is executed during the entire charging process.

What is claimed is:

1. An electrical charging system comprising:
   a first battery pack having a first plurality of lithium-based battery cells, each of the first battery cells having an individual state of charge, wherein the first battery pack has a first charging controller consisting of a single unit disposed inside the first battery pack and operable to monitor the individual state of charge of at least one battery cell and to directly control a charging current being supplied to the first battery pack based at least in part on the state of charge of the at least one battery cell;
   a second battery pack having a second plurality of lithium-based battery cells wherein the second plurality of lithium-based battery cells is different from the first plurality of lithium-based battery cells, each of the second battery cells having an individual state of charge, wherein the second battery pack has a second charging controller consisting of a single unit disposed inside the second battery pack and operable to monitor the individual state of charge of at least one battery cell and to directly control a charging current being supplied to the second battery pack based at least in part on the state of charge of the at least one battery cell, wherein the total number of lithium-based battery cells in the first battery pack is different than the total number of lithium-based battery cells in the second battery pack; and,
   an electrical charging device being operable to supply power to both the first battery pack and the second battery pack, the electrical charging device comprising:
   a circuit for converting between AC and DC;
   a first control terminal directly coupled to one of the first charging controller and the second charging controller for receiving a charging control signal sent by one of the first charging controller and the second charging controller;
   at least one voltage output terminal, and
   a controlled module, wherein the controlled module controls the circuit for converting between AC and DC to output a current with a charging voltage based on the charging control signal received from the first control terminal.

2. An electrical charging system as set forth in claim 1, wherein the electrical charging device is a power adapter.

3. An electrical charging system as set forth in claim 1, wherein the electrical device includes a controlled module to supply a current with accurate charging voltage.

4. An electrical charging system as set forth in claim 1, wherein the control signal is one of a voltage signal and a current signal.

5. A lithium battery pack for a power tool comprising:
   a housing;
   a plurality of lithium-based battery cells each having an individual state of charge;
   a charging controller consisting of a single unit disposed inside the battery pack and operable to monitor the individual state of charge of at least one battery cell, the charging controller operable to generate a control signal representative of the individual state of charge of the at least one battery cell; and
   at least one terminal electrically connectable to a corresponding terminal of a power adapter, wherein the power adapter includes a controlled module directly coupleable to the charging controller to receive the control signal and supply a current with accurate charging voltage to battery packs having different charging parameters.

6. The lithium battery pack as set forth in claim 5, wherein the power adapter has a first control terminal and the battery pack has a second control terminal, the first control terminal being operably coupled with the second control terminal; wherein the charging controller transmits a control signal to the controlled module through the first and the second control terminals.

7. The lithium battery pack as set forth in claim 5, wherein a charging parameter is determined and transmitted to the controlled module by the charging controller based on the state of the cells and information stored in the battery pack.

8. The lithium battery pack as set forth in claim 7, wherein the charging controller includes a sampling circuit for collecting the charging parameter, a battery protection circuit, and a matching network for outputting a control signal to the controlled module.

9. The lithium battery pack as set forth in claim 5, wherein the controlled module comprises a center controlled module and a feedback module.

10. The lithium battery pack as set forth in claim 5, wherein the charging controller is operable to monitor the state of the individual cell.

11. A lithium battery pack for a power tool comprising:
    a housing;
    a plurality of lithium-based battery cells each having an individual state of charge;
    a charging controller consisting of a single unit disposed inside the battery pack and operable to monitor the individual state of charge of at least one battery cell and to generate a control signal transmittable to a power adapter, thereby controlling a charging current being supplied to the battery pack based on the individual state of charge of the at least one battery cell; and
    at least one terminal to electrically connect to the power adapter, wherein the power adapter includes a controlled module directly coupleable to the charging controller to receive the control signal and in response to the control signal supply a current with accurate charging voltage to battery packs having different charging parameters.

12. The lithium battery pack as set forth in claim 11, wherein a charging parameter is determined and transmitted to the controlled module by the charging controller based on the state of the cells and information stored in the battery pack.

13. The lithium battery pack as set forth in claim 12, wherein the information stored in the battery pack may be stored in a MCU.

14. The lithium battery pack as set forth in claim 11, wherein a required charging voltage is supplied by the controlled module with a PWM to control a circuit for converting between AC and DC in the power adapter.

15. A lithium battery pack for a power tool comprising:
    a housing;
    a plurality of lithium-based battery cells each having an individual state of charge;
    a charging controller consisting of a single unit disposed inside the battery pack and operable to monitor the individual state of charge of at least one battery cell, and to transmit a control signal representative of the monitored sate of the battery cell to a power adapter; and at least one terminal for electrically connecting to the power adapter, the power adapter including a controlled module directly coupleable to the charging controller for receiving the control signal and supplying a current having an accurate charging voltage to battery packs having different charging parameters, wherein the charging controller includes a first charging mode and a second charging mode, and wherein the controller implements one of the first charging mode and the second charging mode based at least in part on the individual state of charge of the at least one battery cell.

16. The lithium battery pack as set forth in claim 15, wherein the charging controller includes:
   a voltage sampling circuit for sensing the individual voltage of the cells;
   a current sampling circuit for sensing current of the cells;
   a temperature sampling circuit for sensing temperature of the cells;
   a matching network for controlling the control signal; and,
   a MCU for controlling the voltage sampling circuit, the current sampling circuit, the temperature sampling circuit and the matching network.

17. The lithium battery pack as set forth in claim 15, further including a protection element.

18. The lithium battery pack as set forth in claim 17, wherein the protection element is selected from the group consisting of a fuse, a NTC resistor, a PTC resistor and a varistor.

19. An electrical charging system for a power tool comprising:

a battery pack comprising:
   a plurality of battery cells, each of the battery cells having an individual state of charge;
   a voltage input terminal electrically coupled to the plurality of battery cells;
   a charging controller consisting of a single unit disposed inside the battery pack and operably coupled to monitor the individual state of charge of at least one of the plurality of battery cells battery cell and generate a charging control signal representative of the monitored state of charge; and
   a control terminal for transmitting the charging control signal; and an electrical charging device electrically coupled to a power supply, and configured to electrically couple to the battery pack, the electrical charging device comprising:
   a voltage output terminal electrically coupleable to the power supply and configured to releasably mate with the voltage input terminal of the battery pack to supply a charging current to the voltage input terminal of the battery pack;
   a control terminal electrically coupleable to the control terminal of the battery pack for receiving the charging control signal transmitted by the battery pack; and
   a controlled module electrical coupled to the voltage output terminal and the control terminal to directly receive the charging control signal from the charging controller and to vary the charging current based at least partially upon the charging control signal.

* * * * *